United States Patent
Weinold

(10) Patent No.: US 7,107,472 B2
(45) Date of Patent: Sep. 12, 2006

(54) MOBILE DATA SYSTEM HAVING AUTOMATED SHUTDOWN

(75) Inventor: Christoffer S. Weinold, Carlsbad, CA (US)

(73) Assignee: Polaris Digital Systems, Inc., Columbia, SC (US)

( * ) Notice: Subject to any disclaimer, the term of this patent is extended or adjusted under 35 U.S.C. 154(b) by 580 days.

(21) Appl. No.: 09/852,453

(22) Filed: May 9, 2001

(65) Prior Publication Data

US 2002/0169991 A1 Nov. 14, 2002

(51) Int. Cl.
  *G06F 1/26* (2006.01)
  *G06F 3/00* (2006.01)
  *B60L 1/00* (2006.01)

(52) U.S. Cl. .............. 713/324; 713/300; 713/310; 713/330; 713/340; 710/15; 307/9.1; 307/10.7

(58) Field of Classification Search .......... 307/9.1, 307/10.1, 10.7, 116, 125, 126, 130, 131, 38, 307/39; 713/300, 310, 320–324, 330, 340
See application file for complete search history.

(56) References Cited

U.S. PATENT DOCUMENTS

| | | | | |
|---|---|---|---|---|
| 4,611,289 A | * | 9/1986 | Coppola | 713/300 |
| 4,818,891 A | * | 4/1989 | Drinkwater | 307/64 |
| 4,864,154 A | * | 9/1989 | Copeland et al. | 307/10.7 |
| 4,868,832 A | * | 9/1989 | Marrington et al. | 714/22 |
| 5,089,762 A | * | 2/1992 | Sloan | 320/127 |
| 5,138,246 A | * | 8/1992 | Kobayashi | 320/136 |
| 5,151,855 A | * | 9/1992 | Gray et al. | 713/330 |
| 5,159,257 A | * | 10/1992 | Oka et al. | 320/136 |
| 5,272,386 A | * | 12/1993 | Kephart | 307/116 |
| 5,298,795 A | * | 3/1994 | Suzuki et al. | 307/116 |
| 5,315,161 A | * | 5/1994 | Robinson et al. | 307/66 |
| 5,349,668 A | * | 9/1994 | Gladstein et al. | 713/340 |
| 5,381,554 A | * | 1/1995 | Langer et al. | 714/14 |
| 5,420,496 A | * | 5/1995 | Ishikawa | 320/106 |
| 5,493,685 A | * | 2/1996 | Zenda | 713/340 |
| 5,510,691 A | * | 4/1996 | Palatov | 320/111 |

(Continued)

FOREIGN PATENT DOCUMENTS

JP   10-290526   * 10/1998

(Continued)

OTHER PUBLICATIONS

Machine translations from Japanese into English for the cited Japanese patent publications.□□*

(Continued)

*Primary Examiner*—Kim Huynh
*Assistant Examiner*—Alan Chen
(74) *Attorney, Agent, or Firm*—McNair Law Firm, P.A.

(57) ABSTRACT

A mobile data system having automated shutdown is mounted in a motor vehicle having a vehicle motor and a vehicle electrical power source. The vehicle electrical power source provides variable voltage electrical power to the motor vehicle and to the mobile data system. The mobile data system includes a system computer for informational data retrieval in response to user input queries, a system interface device, and a computer power supply. The computer power supply is electrically coupled with the vehicle electrical power source through the system interface device to convert the variable voltage electrical power to voltage regulated electrical power for operation of the system computer. The system interface device creates parameter comparison data, in response to which the system computer creates a system shutdown command. The system shut down command invokes shutdown of the mobile data system by interrupting transmission of the voltage regulated electrical power from the computer power supply to the system computer.

33 Claims, 4 Drawing Sheets

U.S. PATENT DOCUMENTS

| | | | | |
|---|---|---|---|---|
| 5,621,299 | A | * | 4/1997 | Krall .......................... 320/103 |
| 5,666,006 | A | * | 9/1997 | Townsley et al. ............. 307/66 |
| 5,793,124 | A | * | 8/1998 | Mitzaki ....................... 307/66 |
| 5,901,056 | A | * | 5/1999 | Hung .......................... 363/142 |
| 5,923,099 | A | * | 7/1999 | Bilir ............................. 307/64 |
| 5,949,148 | A | * | 9/1999 | Wagner ..................... 307/10.1 |
| 6,178,515 | B1 | * | 1/2001 | Hayashi et al. ............. 713/300 |
| 6,204,574 | B1 | * | 3/2001 | Chi ............................. 307/66 |
| 6,356,823 | B1 | * | 3/2002 | Iannotti et al. ............... 701/35 |
| 6,442,702 | B1 | * | 8/2002 | Ishikawa et al. ............ 713/340 |
| 6,598,168 | B1 | * | 7/2003 | Chen .......................... 713/300 |
| 6,643,786 | B1 | * | 11/2003 | Kawakami .................. 713/340 |
| 2002/0169991 | A1 | * | 11/2002 | Weinold ..................... 713/324 |

FOREIGN PATENT DOCUMENTS

| | | | |
|---|---|---|---|
| JP | 2000-172384 | * | 6/2000 |
| JP | 2000-172385 | * | 6/2000 |
| JP | 2000-228829 | * | 8/2000 |
| JP | 2000-233697 | * | 8/2000 |

OTHER PUBLICATIONS

Advanced Power Management (APM) BIOS Interface Specification, Revision 1.2, Feb. 1996.□□*

PCM-P50 High Efficiency PC/104 Vehicle Power Supply, copyright 1998 AAEON Technology.*

PCM-4335 All-in-one 486DX-66 with Flat Panle/CRT PC/104 Module, copyright 1997, 1998 AAEON Technology, May 1999, 3rd edition.*

OPUS Solutions, Inc. ATX/ITX DC-DC 90W Power Supply User Guide, copyright OPUS Solutions, Inc., 2002,2003.*

* cited by examiner

MOBILE DATA SYSTEM HAVING AUTOMATED SHUTDOWN

TECHNICAL FIELD

The present invention relates generally to mobile data systems employed in emergency response vehicles, and more particularly to a means and method for automatically shutting down a mobile data system.

BACKGROUND OF THE INVENTION

A mobile data system is a computerized data query and retrieval system adapted for on-board mounting in automobiles, trucks and other such vehicles. The mobile data system comprises a computer and a number of peripherals, including a keyboard which enables the user to input queries to the computer and a monitor which enables the user to view retrieved data. The mobile data system is commonly employed in emergency response vehicles such as those having police, fire or medical applications. The mobile data system permits emergency response personnel to rapidly retrieve informational data at an emergency response site from an on-board data storage device or from data stored at a remote computer, which is in communication with the computer of the mobile data system. For example, a mobile data system mounted in a police vehicle permits a police officer to query and retrieve informational data regarding the driving record of a driver and the registration record of an automobile during a roadside traffic stop.

The mobile data system requires electrical power to operate, which is typically supplied by the battery of the vehicle in which the system is mounted. As long as the engine of the vehicle is running, the battery is being recharged and the mobile data system does not significantly impact the power output of the battery. However, if the mobile data system draws power from the battery for a prolonged period of time while the engine is not running, which often occurs in emergency situations, the mobile data system can inadvertently drain the battery power to the point where the battery lacks sufficient power to start the vehicle and/or to operate the mobile data system. This is clearly an undesirable consequence.

To prevent undue power drain from the battery, it is generally necessary to shut down the mobile data system in accordance with a regimented manual shutdown procedure whenever the engine of the vehicle is turned off for any extended period of time. If this shutdown procedure is not followed properly or if the mobile data system shuts down on its own due to loss of power resulting from a dead battery or a sudden inadvertent power disconnect, the operating system of the computer or the application software may crash causing computer hard drive errors and unreliable operation of the computer upon rebooting. Therefore, the present invention recognizes a need for an improved means and method of shutting down a mobile data system.

It is an object of the present invention to provide a mobile data system having means, which perform automated shutdown of the system. More particularly, it is an object of the present invention to provide a mobile data system having integrated means, which perform automated shutdown of the mobile data system when predetermined operating criteria are met. It is another object of the present invention to provide a mobile data system having automated shutdown means, which prevent the mobile data system from draining the system power source. It is yet another object of the present invention to provide a mobile data system having automated shutdown means, which avoid shutdown irregularities causing disruption of the computer operating system and applications software. It is still another object of the present invention to provide a mobile data system having automated shutdown means, which avoid shutdown irregularities causing hard drive errors in the system computer. It is a further object of the present invention to provide a method for monitoring power input to a mobile data system. It is still a further object of the present invention to provide a method for automatically shutting down a mobile data system in response to monitored power input criteria. These objects and others are accomplished in accordance with the invention described hereafter.

SUMMARY OF THE INVENTION

The present invention is a mobile data system having automated shutdown. The mobile data system is mounted in a motor vehicle having a vehicle motor and a vehicle electrical power source. The vehicle electrical power source provides variable voltage electrical power to the motor vehicle and to the mobile data system. The mobile data system comprises a system computer, a system interface device, a computer power supply and means for interrupting transmission of voltage regulated electrical power from the computer power supply to the system computer in response to a system shutdown command.

The system computer has means for informational data retrieval in response to user input queries and means for creating the system shutdown command in response to parameter comparison data. The system interface device is electrically coupled with the vehicle electrical power source to receive the variable voltage electrical power from the vehicle electrical power source. The computer power supply is positioned in series between the system computer and the system interface device. The computer power supply is electrically coupled with the system interface device and the system computer to receive the variable voltage electrical power from the system interface device, convert the variable voltage electrical power to voltage regulated electrical power, and transmit the voltage regulated electrical power to the system computer for informational data retrieval operation of the system computer. The computer power supply preferably includes a DC to DC converter and an enabling switch.

The system computer or the system interface device has means for creating the parameter comparison data and transmitting the parameter comparison data from the system interface device to the system computer. The parameter comparison data is a comparison of actual parameter values of an established operating parameter with a threshold parameter value of the established operating parameter. The parameter comparison data creating means preferably includes a computer processor in the system computer or a microprocessor in the system interface device and a system interface operating program running on the microprocessor. The system interface device also includes an analog to digital converter to read real-time operating data. The microprocessor and system interface operating program create the actual parameter values from the real-time operating data. Alternatively, the computer processor creates the actual parameter values from the real-time operating data.

The system interface device further includes a power conditioning device for filtering the variable voltage electrical power and a voltage regulator for voltage regulating a portion of the variable voltage electrical power. The voltage regulated portion of the variable voltage electrical power powers operation of the system interface device. The system shutdown command creating means is responsive to the parameter comparison data and preferably includes the computer processor and an automated shutdown control program running on the computer processor.

The transmission interruption means includes the enabling switch, which has an enabling state and a disabling state. The computer power supply transmits the voltage regulated electrical power to the system computer when the enabling switch is in the enabling state and the computer power supply interrupts transmission of the voltage regulated electrical power to the system computer when the enabling switch is in the disabling state. The transmission interruption means further includes means in the system interface device for creating a control signal in response to the system shutdown command. The control signal means includes the microprocessor and system interface operating program running on the microprocessor. The control signal means further includes a communications link between the microprocessor and the enabling switch for transmitting the control signal from the microprocessor to the enabling switch.

In accordance with an alternate embodiment, the enabling switch is omitted from the computer power supply or otherwise not utilized. The transmission interruption means includes a system power switch having an open state and a closed state. The variable voltage electrical power is transmitted through the system power switch to the computer power supply when the system power switch is in the closed state and the system power switch interrupts transmission of the variable voltage electrical power to the computer power supply when the system power switch is in the open state.

The present invention is also a method for automated shutdown of the mobile data system. The method comprises transmitting the variable voltage electrical power from the vehicle electrical power source of the motor vehicle to the computer power supply of the mobile data system. The variable voltage electrical power is converted to voltage regulated electrical power in the computer power supply and transmitted to the system computer of the mobile data system for informational data retrieval operation, wherein at least one application program is running on the system computer.

An established operating parameter is established as a shutdown indicator for the mobile data system and a threshold parameter value is assigned to the established operating parameter. Exemplary established operating parameters include the time duration the vehicle motor is off or the charge level on the vehicle electrical power source. Operation of the mobile data system or the motor vehicle is monitored to determine actual parameter values of the established operating parameter. The actual parameter values are compared with the threshold parameter value to create parameter comparison data. Transmission of the voltage regulated electrical power from the computer power supply to the system computer is interrupted in response to the parameter comparison data and, specifically, when the actual parameter value is equal to or falls below the threshold parameter value.

More particularly, transmission of the voltage regulated electrical power from the computer power supply to the system computer is interrupted by creating a system shutdown command in response to the parameter comparison data using the system computer. Thereafter, at least one application program running on the system computer is closed in response to the parameter comparison data. A control signal is created in response to the system shutdown command. The control signal is communicated to the enabling switch of the computer power supply. The enabling switch transitions from an enabling state to a disabling state in response to the control signal, thereby interrupting transmission of the voltage regulated electrical power from the computer power supply to the system computer. In accordance with an alternate embodiment, wherein the computer power supply lacks an enabling switch or the enabling switch is otherwise not utilized, a system power switch control signal is created in response to the system shutdown command. The system power switch transitions from a closed state to an open state in response to the system power switch control signal, which interrupts the variable voltage electrical powerfeed to the computer power supply. In either case, the mobile data system is ultimately shut down by interruption of the voltage regulated electrical power feed from the computer power supply to the system computer after the at least one application program has been closed.

The present invention will be further understood from the drawings and the following detailed description.

DESCRIPTION OF PREFERRED EMBODIMENTS

Figure 1:
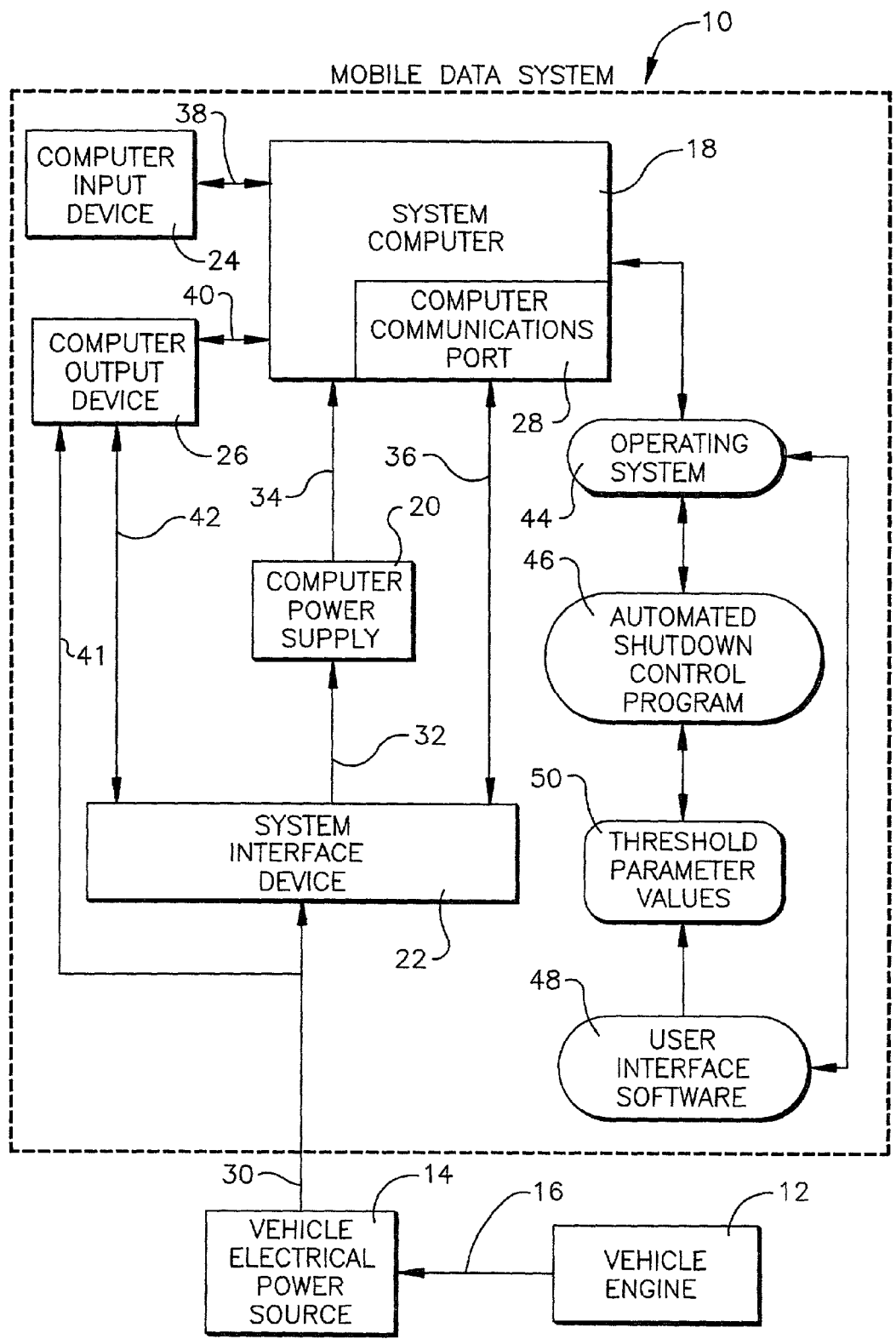
FIG. 1 is a schematic block diagram of a mobile data system of the present invention having automated shutdown.

Referring to FIG. 1, a mobile data system of the present invention having automated shutdown means is shown schematically and generally designated 10. The mobile data system 10 is mounted in a motor vehicle (not shown) such as an emergency response vehicle. The motor vehicle has a vehicle engine 12 and a vehicle electrical power source 14, which are cooperatively associated with the mobile data system 10. A hard wire coupling 16 connects the vehicle engine 12 and the vehicle electrical power source 14. The hard wire coupling 16 enables transmission of electrical power from the vehicle engine 12 to the vehicle electrical power source 14.

The vehicle engine 12 is typically a conventional internal combustion engine and the vehicle electrical power source 14 is typically a rechargeable wet-cell battery of the type conventionally used in motor vehicles. The specific vehicle engine 12 having utility in the practice of the present invention has sufficient mechanical power output capacity to simultaneously power a vehicle drive train and an electrical generator of the vehicle engine 12. The electrical generator maintains an electrical charge on the vehicle electrical power source 14 via the hard wire coupling 16 when the vehicle engine 12 is running. The specific vehicle electrical power source 14 having utility in the practice of the present invention has sufficient electrical power output capacity to simultaneously satisfy the electrical power requirements of the motor vehicle and the mobile data system 10 when the vehicle electrical power source 14 is adequately charged by the electrical generator of the vehicle engine 12. A conventional 12-volt vehicle battery is an exemplary vehicle electrical power source 14.

The mobile data system 10 comprises a plurality of discrete electrically-powered devices including a system computer 18, a computer power supply 20, a system interface device 22, and a plurality of computer peripherals. The computer peripherals of the present embodiment are a computer input device 24 and a computer output device 26. The means for automated shutdown of the mobile data system 10 are wholly integrated into the structure of the above-recited devices. Accordingly, the specific structure of the automated shutdown means is described below in the context of the devices 18, 20, 22, 24, 26 and their associated components.

The system computer 18 has substantially the equivalent computer capabilities of a conventional desktop computer. As such, the system computer 18 comprises a hard drive, computer processor, memory and plurality of timers, including a shutdown timer. The system computer 18 further comprises a computer communications port 28, which is preferably a bidirectional serial communications port. The computer power supply 20 preferably includes a DC to DC converter and an enabling switch. The DC to DC converter produces voltage regulated electrical power from variable voltage electrical power for use as electrical operating power by the system computer 18. The enabling switch selectively enables or disables operation of the DC to DC converter by selectively transitioning between an enabling and disabling state, respectively, to selectively interrupt the feed of voltage regulated electrical power from the computer power supply 20 to the system computer 18.

The vehicle electrical power source 14, system interface device 22, computer power supply 20, and system computer 18 are serially positioned relative to one another. Hard wire couplings 30, 32, 34 connect the respective components 14, 22, 20, 18 in series. The hard wire coupling 30 enables transmission of variable voltage electrical power from the vehicle electrical power source 14 to the system interface device 22, the hard wire coupling 32 enables transmission of the variable voltage electrical power from the system interface device 22 to the computer power supply 20, and the hard wire coupling 34 enables transmission of voltage regulated electrical power from the computer power supply 20 to the system computer 18. A hard wire coupling 36 connects the computer communications port 28 with the system interface device 22, enabling functions described below with reference to FIG. 2.

The computer input device 24 is typically a keyboard, mouse, touch screen, or combination thereof. Included within the term "mouse" are functional equivalents of a mouse such as a track ball or the like. The computer output device 26 is typically a display monitor, printer, or combination thereof. Exemplary display monitors include a flat panel LCD display or CRT. In some cases the computer input device 24 and computer output device 26 may be integrally contained within the same unit as, for example, in the case of a display monitor output having a touch screen input. In any case, hard wire couplings 38, 40 connect the computer input device 24 and the computer output device 26, respectively, with the system computer 18. The hard wire coupling 38 enables the computer input device 24 to communicate information from the user to the system computer 18, while the hard wire coupling 40 enables the computer output device 26 to communicate information from the system computer 18 to the user.

In the present embodiment, the computer output device 26 is a display monitor having its own internal power supply as well as other components such as back lights. The internal power supply supplies voltage regulated electrical power to the display monitor independent of the computer power supply 20 for operation of the display monitor. The internal power supply obtains variable voltage electrical power directly from the vehicle electrical power source 14 via a hard wire coupling 41, which branches from the hard wire coupling 30. The internal power supply is substantially similar to the computer power supply 20 in both structure and function. A hard wire coupling 42 also connects the computer output device 26 with the system interface device 22, enabling functions described below with reference to FIG. 2. In contrast to the computer output device 26, the computer input device 24 obtains its voltage regulated electrical power for operation from the computer power supply 20 via the system computer 18.

The logic for the function of the system computer 18 is provided by a plurality of operational and applications software programs, which are preferably stored within the system computer 18 and run on the computer processor. The software programs are specifically embodied in an operating system 44, an automated shutdown control program 46, and user interface software 48. The automated shutdown control program 46 is the applications program, which provides the detailed logic enabling operation of the system computer 18 in accordance with the present invention.

In practice, the automated shutdown control program 46 establishes one or more established operating parameters as shutdown indicators for the mobile data system 10. A threshold parameter value 50 is then assigned to each established operating parameter. The threshold parameter values 50 may be assigned to the established operating parameters by the user, wherein the user programs the threshold parameter values directly into the automated shutdown control program 46. Alternatively, the threshold parameter values 50 may be embodied in the original code of the automated shutdown control program 46 as default values. In any case, the threshold parameter values 50 may be subsequently adjusted at any time by user reprogramming as desired. The user interface software 48 provides a graphical user interface, which enables the user, in association with the computer input device 24, to program or reprogram the threshold parameter values 50 into the automated shutdown control program 46.

Figure 2:
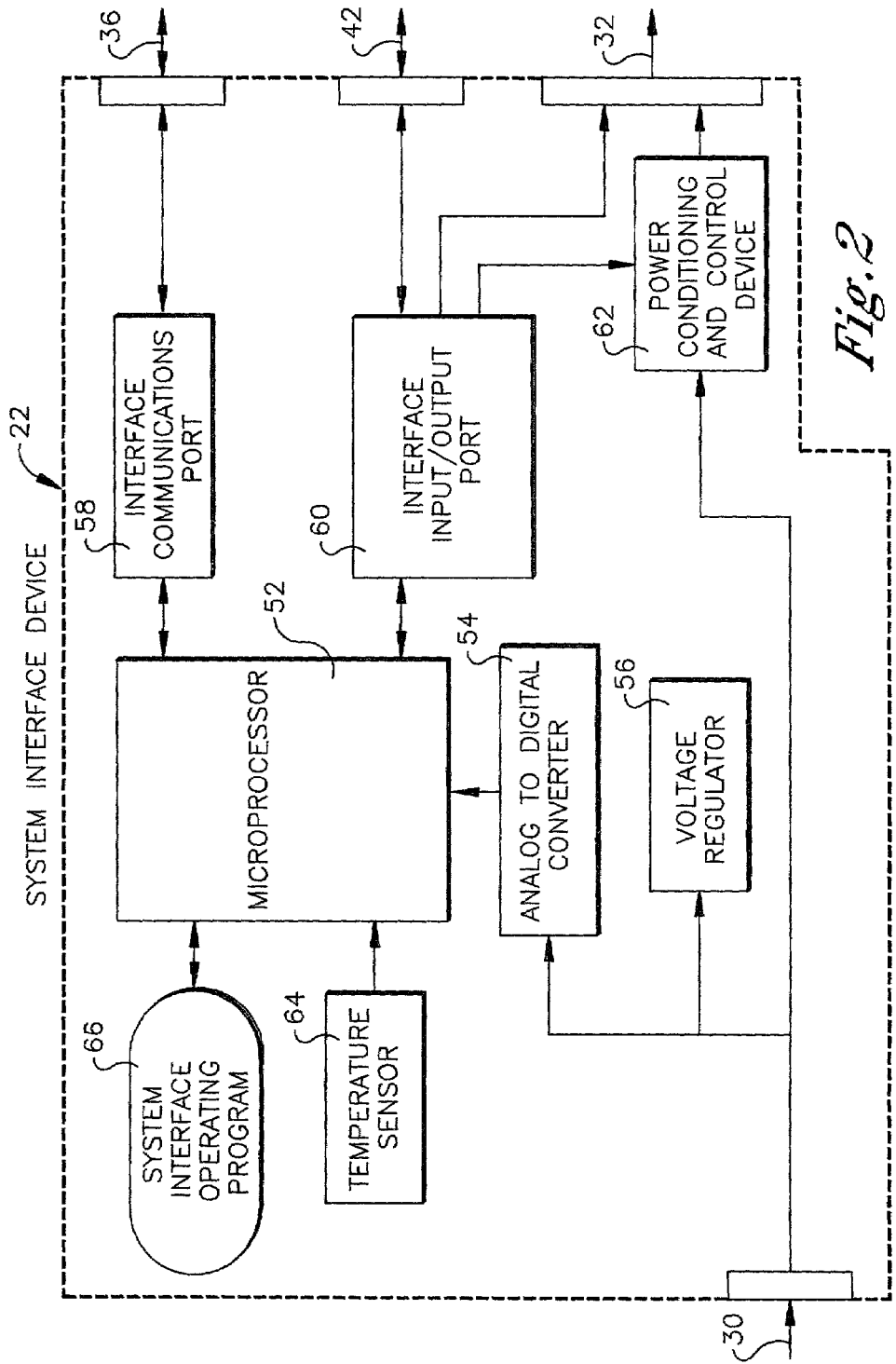
FIG. 2 is a schematic circuit diagram of the system interface device shown in the mobile data system of FIG. 1.

Details of the system interface device 22 are described below with reference to FIG. 2. The system interface device 22 comprises a plurality of internally-linked and functionally-cooperative components including a microprocessor 52, an analog to digital converter 54, a voltage regulator 56, an interface communications port 58, an interface input/output port 60, a power conditioning and control device 62, and a temperature sensor 64. The microprocessor 52 contains a timer, an internal random-access memory and a nonvolatile read-only memory. The logic for the function of the microprocessor 52 in accordance with the present invention is enabled by a system interface operating program 66 stored in the nonvolatile read-only memory of the microprocessor 52. The microprocessor 52 also contains a plurality of input/output ports, which enable direct communication represented by the directional arrows between the microprocessor 52 and the analog to digital converter 54, interface communications port 58, interface input/output port 60, and temperature sensor 64, respectively.

Referring additionally back to FIG. 1, the interface communications port 58 is preferably a serial communications port, which is coupled with the computer communications port 28 via the hard wire coupling 36. The interface communications port 58, hard wire coupling 36, and computer communications port 28 in series enable the exchange of information in the form of digital data between the microprocessor 52 and the system computer 18. The interface input/output port 60 is coupled with the computer output device 26 via the hard wire coupling 42. The interface input/output port 60 and hard wire coupling 42 in series enable the exchange of control signals between the computer output device 26 and the microprocessor 52. Control signals to the computer output device 26 turn the computer output device 26 on or off or otherwise control electrical power consumption or operation of back lights at the computer output device 26. Control signals from the computer output device 26 originate from one or more manually operated switches at the computer output device 26 such as an on/off switch (not shown).

The interface input/output port 60 is additionally coupled with the computer power supply 20 via the hard wire coupling 32. The interface input/output port 60 and hard wire coupling 32 in series enable the transmission of control signals from the microprocessor 52 to the computer power supply 20. Control signals from the interface input/output port 60 to the computer power supply 20 enable or disable the computer power supply 20 or otherwise control operation of the computer power supply 20 to turn the system computer 18 on or off. The interface input/output port 60 is further coupled with the power conditioning and control device 62. The interface input/output port 60 enables the transmission of control signals from the microprocessor 52 to the power conditioning and control device 62. Control signals from the interface input/output port 60 to the power conditioning and control device 62 may control the function and operation of the power conditioning and control device 62.

The power conditioning and control device 62 is a filter for variable voltage electrical power received from the vehicle electrical power source 14 via the hard wire coupling 30. The power conditioning and control device 62 feeds the resulting filtered variable voltage electrical power to the computer power supply 20 via the hard wire coupling 32. As noted above, the computer power supply 20 includes an enabling switch, which is a transistor gate, MOSFET, relay, or any other such means capable of selectively enabling or disabling operation of the computer power supply 20 in response to an enabling switch control signal from the microprocessor 52, preferably without interrupting the feed of variable voltage electrical power feed from the system interface device 22 to the computer power supply 20.

In accordance with an alternate embodiment, the power conditioning and control device 62 is provided with a system power switch, such as a relay, transistor gate, or any other such means capable of selectively interrupting the feed of variable voltage electrical power to the computer power supply 20, which overrides or replaces the function of the enabling switch. The system power switch has an open or closed state, which selectively switches the feed of variable voltage electrical power from the system interface device 22 to the computer power supply 20 off or on, respectively. In accordance with yet other alternate embodiments of the present invention, the system power switch can alternatively be positioned at other points within the system interface device 22, within the computer power supply 20, or at points along hard wire coupling 32, in a manner readily apparent to the skilled artisan to selectively interrupt the transmission of variable voltage electrical power to the computer power supply 20. The power conditioning and control device 62 can further be provided with a switch for selectively shunting additional electrical power if desired onto the hard wire coupling 32 from an alternate power source (not shown). The voltage regulator 56 is a device, which regulates the voltage of the variable voltage electrical power supplied from the vehicle electrical power source 14 to the components of the system interface device 22 via the hard wire coupling 30 for operation of the respective components. The temperature sensor 64 is a device, which measures ambient temperature at the system interface device 22.

METHOD OF OPERATION

Like the structure of the automated shutdown means described above, the method of operating the automatic shutdown means is wholly integrated within the overall operation of the mobile data system 10. Accordingly, the specific method of operating the automated shutdown means is described below in the context of an overall method of operating the mobile data system 10.

During normal operation of the mobile data system 10 and an associated motor vehicle, in which the mobile data system 10 is mounted, the vehicle electrical power source 14 outputs variable voltage electrical power to the computer power supply 20 through the system interface device 22. The voltage variability of the electrical power is typically attributable to fluctuations in the charged state of the vehicle electrical power source 14. The computer power supply 20 converts the variable voltage electrical power to voltage regulated electrical power, which is supplied to the system computer 18 and computer input device 24. In the present embodiment, the vehicle electrical power source 14 also outputs variable voltage electrical power to the internal power supply of the computer output device 26, which converts the variable voltage electrical power to voltage regulated electrical power for operation of the computer output device 26. It is alternatively, within the scope of the present invention for the computer output device 26 to receive voltage regulated electrical power from the computer power supply 20 in substantially the same manner as the computer input device 24, thereby obviating the internal power supply in the computer output device 26.

The voltage regulated electrical power preferably has a constant voltage, which is compatible with operation of the system computer 18 and its peripherals. Although the electrical voltage at the vehicle electrical power source 14 is permissibly variable, it is nevertheless necessary to maintain the voltage level of the variable voltage electrical power at the vehicle electrical power source 14 within a predetermined required operating voltage range to enable proper operation of the motor vehicle and mobile data system 10. For example, a typical required operating voltage range is between about 11 and 15 volts DC.

The voltage level at the vehicle electrical power source 14 varies as a function of both the charge level of the vehicle engine 12 and the power requirements of the motor vehicle and mobile data system 10. The voltage level increases when either the power requirements of the vehicle and mobile data system 10 decrease or the charge level of the vehicle engine 12 increases. When the vehicle engine 12 is running, it actively maintains an electrical charge on the vehicle electrical power source 14. Under these conditions, the charge level is high and the voltage level at the vehicle electrical power source 14 is relatively insensitive to the power requirements of the motor vehicle and mobile data system 10. As a result, there is little risk the electrical power requirements of the motor vehicle and mobile data system 10 will cause the voltage level at the vehicle electrical power source 14 to fall below the minimum required operating voltage level (e.g., 11 volts DC) when the vehicle engine 12 is running.

When the vehicle engine 12 is not running, however, there is no active maintenance of the electrical charge on the vehicle electrical power source 14 by the vehicle engine 12. If the mobile data system 10 operates for a prolonged period of time while the vehicle engine 12 is off, there is a high risk the electrical power requirements of the mobile data system 10 will eventually cause the voltage level at the vehicle electrical power source 14 to fall below its minimum required operating voltage level. The risk results from the fact that the voltage level at the vehicle electrical power source 14 decreases when the power requirements of the vehicle and mobile data system 10 increase or when the charge level of the vehicle engine 12 decreases, for example, when the vehicle engine 12 is off. The present invention provides a method for automatically shutting down the mobile data system 10 before the voltage level at the vehicle electrical power source 14 falls below its minimum required operating voltage level.

In accordance with the present method, the automated shutdown control program 46 establishes specific established operating parameters as shutdown indicators for the mobile data system 10 in order to maintain the voltage level at the vehicle electrical power source 14 at or above the minimum required operating voltage level. The established operating parameters may include, for example, the time duration that the vehicle engine 12 is off and/or the charge level of the vehicle engine 12 on the vehicle electrical power source 14. The automated shutdown control program 46 also assigns threshold parameter values 50 to the established operating parameters as directed by user input or by default values. The threshold parameter values 50 are then stored in the system computer 18.

The system interface device 22 subsequently monitors in real-time the actual parameter values of the established operating parameters, compares the actual parameter values to the threshold parameter values 50 obtained from the system computer 18, and returns the resulting parameter comparison data to the system computer 18. The system computer 18, in cooperation with the automated shutdown control program 46 and operating system 44, directs the system interface device 22 in the performance of a controlled and automatic shutdown sequence for the system computer 18 in response to a communication from the system interface device 22 that the actual parameter values meet the threshold parameter values 50.

The specific monitoring, data processing, communication, and control functions of the system interface device 22 are directed by the system interface operating program 66. In particular, the system interface operating program 66 reads real-time operating data relating to the mobile data system 10 or associated motor vehicle from the analog to digital converter 54, determines actual parameter values (such as the voltage level at the vehicle electrical power source 14) from the real-time operating data, and compares threshold parameter values 50 provided by the system computer 18 with the actual parameter values to determine whether the vehicle engine 12 is on or off. The system interface operating program 66 sends status information back to the system computer 18 reporting the on/off state of the vehicle engine 12 and the real-time operating data readings from the analog to digital converter 54. The system interface operating program 66 also reads data from the temperature sensor 64. Among its control functions, the system interface operating program 66 controls operation of the interface input/output port 60, the power conditioning and control device 62, and external heaters (not shown) if present in the mobile data system 10. The system interface operating program 66 also enables user control of the computer power supply 20. For example, if the computer power supply 20 is in the off condition, the system interface operating program 66 monitors the state of an external switch (not shown) manually operable by the user on the computer output device 24 or other system device and, upon detecting a change in switch state, sends a signal changing the computer power supply 20 to the on condition.

Figure 3A:
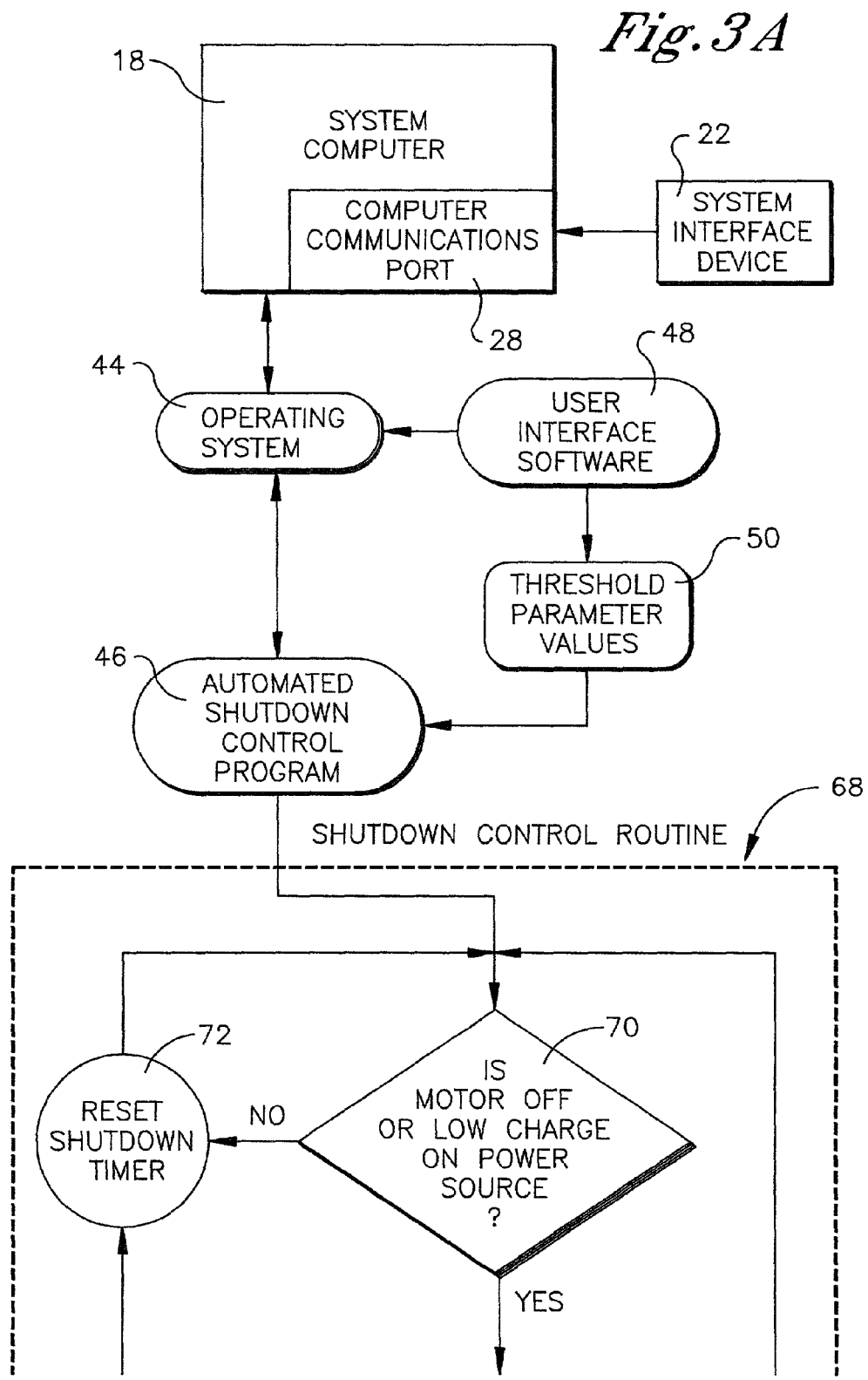
FIGS. 3A and 3B are a schematic logic flow chart of the automated shutdown control program executed by the system computer shown in the mobile data system of FIG. 1.
Figure 3B:
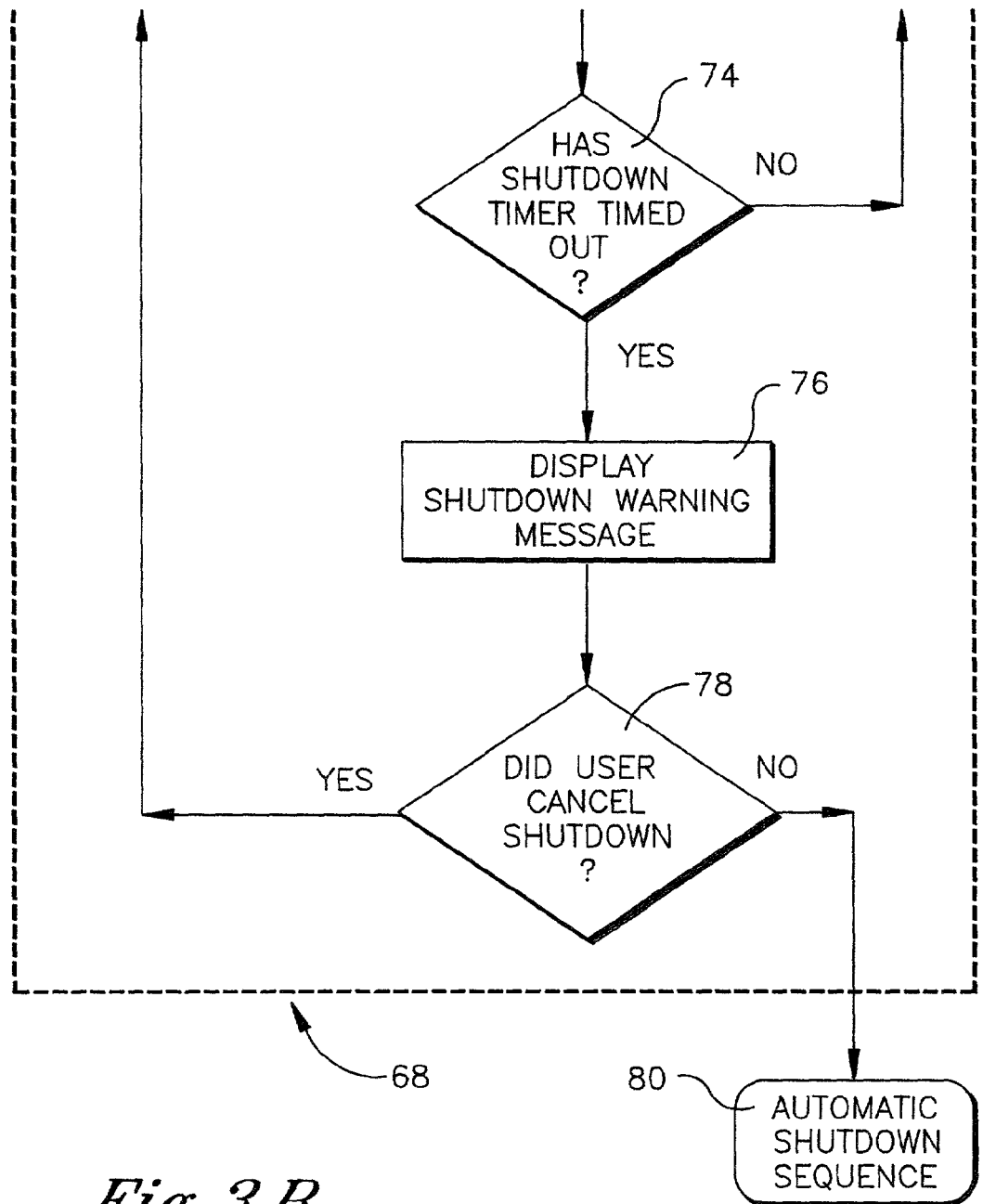

FIGS. 3A and 3B show a simplified flow chart of the present automated shutdown method. The operating system 44 effectuates operation of the system computer 18 including controlling execution of the applications programs available to the system computer 18. The primary applications program of interest to the present shutdown method is the automated shutdown control program 46 running on the computer processor of the system computer 18, which ultimately implements the automated shutdown method. In particular, the automated shutdown control program 46 utilizes a comparison of the threshold parameter values 50 and actual parameter values provided by the system interface device 22 to implement a shutdown control routine 68 described below. The user interface software 48 simultaneously provides a graphical user interface to display actual parameter values, such as real-time voltage readings, from the system interface device 22 to the user.

FIGS. 3A and 3B show a specific sequence of steps in the shutdown control routine 68, which are performed in cooperation with the shutdown timer of the system computer 18 in response to comparison of the threshold parameter values 50 and actual parameter values. In a first step 70, the threshold parameter values 50 are sent to the system interface device 22 for determining the on/off state of the vehicle engine 12 or the charge level on the vehicle electrical power source 14. If the vehicle engine 12 is in the on state or the charge level on the vehicle electrical power source 14 is at or above the threshold charge level, the shutdown control routine 68 proceeds to step 72, wherein the shutdown timer in the system computer 18 is reset and the shutdown control routine 68 is reinitialized. If the vehicle engine 12 is in the off state or the charge level on the vehicle electrical power source 14 is below the threshold charge level, the shutdown control routine 68 proceeds to step 74, wherein a determination is made whether a threshold time duration has been reached with the vehicle engine 12 in the off state or with the charge level of the vehicle electrical power source 14 below the threshold charge level. If the threshold time duration is not reached, the shutdown control routine 68 is reinitialized. If the threshold time duration is reached, the shutdown control routine 68 proceeds to step 76, wherein a shutdown warning message is displayed on the computer output device 26. Other possible steps in the shutdown control routine 68 not shown may also include turning off back lights on the computer output device 26 or controlling other system devices after certain threshold time durations are reached.

If the shutdown control routine 68 proceeds to step 76, the shutdown control routine 68 can be effectively canceled by means of a user override in step 78 employing the user interface software 48, wherein the shutdown control routine 68 is reinitialized. If the shutdown control routine 68 is not canceled, the shutdown control routine 68 proceeds to initiate an automatic shutdown sequence 80, wherein the automated shutdown control program 46 sends a system shutdown command to the system interface device 22 and thereafter closes all application programs running on the system computer 18. The system interface device 22 in turn sends an enabling switch control signal to the enabling switch of the computer power supply 20, which transitions the enabling switch to a disabling state once the system computer has completed all its tasks.

In accordance with one embodiment, the enabling switch control signal is an electrical signal represented by a DC voltage and the enabling switch is a transistor gate. When the enabling switch control signal is enabling, it has sufficient electrical voltage and current to turn on the transistor gate, thereby maintaining the transistor gate in the on state. Conversely, when the enabling switch control signal is disabling, it has insufficient electrical voltage and current to turn on the transistor gate, thereby maintaining the transistor gate in the off state. The transistor gate is in electrical communication with the circuitry of the DC to DC converter so that operation of the DC to DC converter is enabled when the transistor gate is in the on state, while operation of the DC to DC converter is disabled when the transistor gate is in the off state. It is noted that the present embodiment does not interrupt the feed of variable voltage electrical power feed from the system interface device 22 to the computer power supply 20. Instead, the system interface device 22 shuts down the system computer 18 by disabling operation the computer power supply 20, thereby completing the automatic shutdown sequence 80.

In accordance with an alternate embodiment, wherein the computer power supply 20 lacks an enabling switch, the system interface device 22 shuts down the system computer 18 by directing opening of the system power switch to interrupt the variable voltage electrical power feed to the computer power supply 20. In either case, the mobile data system 10 is ultimately shut down by interruption of the voltage regulated electrical powerfeed to the system computer 18 after all application programs running on the system computer 18 have been closed.

It is noted that all of the above-recited embodiments of the invention utilize the system interface device to perform the function of generating the parameter comparison data. It is within the scope of the present invention, however, to perform the comparison data generation function in the computer processor of the system computer or to perform other recited data processing functions in the computer processor of the system computer, such as creating the actual parameter values from the real-time operating data, while retaining the system interface device for performing some or all of the remaining above-recited threshold parameter value monitoring functions, such as collecting the real-time operating data, and for performing some or all of the remaining above-recited shutdown functions. Such alternate embodiments are readily within the purview of the skilled artisan employing the teaching provided herein.

It is further noted that, as the invention has been described above, a number of specific established operating parameters have been identified as shutdown indicators, such as certain operating conditions and time limits. In addition, the description above teaches the assignment of threshold parameter values to these specific established operating parameters. It is understood, however, that the present invention is not limited to these specific established operating parameters, but encompasses other established operating parameters not expressly disclosed herein, which are within the purview of the skilled artisan and which may be shutdown indicators within the teaching of the present invention.

While the forgoing preferred embodiments of the invention have been described and shown, it is understood that alternatives and modifications, such as those suggested and others, may be made thereto and fall within the scope of the invention.

I claim:

1. A mobile data system having automated shutdown, wherein said mobile data system is mounted in a motor vehicle having a vehicle motor and a vehicle electrical power source for providing variable voltage electrical power to said motor vehicle and said mobile data system, said mobile data system comprising:
    a system computer having means for informational data retrieval in response to user input queries and means for creating a system shutdown command in response to parameter comparison data;
    a system interface device electrically connected with said vehicle electrical power source to receive variable voltage electrical power directly from said vehicle electrical power source;
    a computer power supply positioned in series between said system computer and said system interface device and electrically connected with said system interface device and said system computer to receive said variable voltage electrical power from said system interface device, convert said variable voltage electrical power directly to voltage regulated electrical power, and transmit said voltage regulated electrical power directly to said system computer for informational data retrieval operation thereof;
    means for creating said parameter comparison data, wherein said parameter comparison data is a comparison of actual parameter values of an established operating parameter with a threshold parameter value; and
    means for interrupting transmission of said voltage regulated electrical power from said computer power supply to said system computer in response to said system shutdown command.

2. The mobile data system of claim 1, wherein said computer power supply includes a DC to DC converter.

3. The mobile data system of claim 1, wherein said transmission interruption means includes an enabling switch in said computer power supply having an enabling state and a disabling state, and further wherein said computer power supply transmits said voltage regulated electrical power to said system computer when said enabling switch is in said enabling state and said computer power supply interrupts transmission of said voltage regulated electrical power to said system computer when said enabling switch is in said disabling state.

4. The mobile data system of claim 3, wherein said transmission interruption means further includes means in said system interface device for creating an enabling switch control signal in response to said system shutdown command.

5. The mobile data system of claim 4, wherein said control signal means includes a microprocessor and a system interface operating program running on said microprocessor.

6. The mobile data system of claim 5, wherein said control signal means further includes a communications link between said microprocessor and said enabling switch for transmitting said control signal from said microprocessor to said enabling switch.

7. The mobile data system of claim 1, wherein said transmission interruption means includes a system power switch having an open state and a closed state, and further wherein said variable voltage electrical power is transmitted through said system power switch to said computer power supply when said system power switch is in said closed state and said system power switch interrupts transmission of said variable voltage electrical power to said computer power supply when said system power switch is in said open state.

8. The mobile data system of claim 1, wherein said parameter comparison data creating means includes a microprocessor in said system interface device and a system interface operating program running on said microprocessor.

9. The mobile data system of claim 8, wherein said system interface device includes an analog to digital converter to read real-time operating data, and further wherein said microprocessor and system interface operating program create said actual parameter values from said real-time operating data.

10. The mobile data system of claim 9, wherein said system interface device includes an analog to digital converter to read real-time operating data, and further wherein a computer processor in said system computer creates said actual parameter values from said real-time operating data.

11. The mobile data system of claim 1, wherein said parameter comparison data creating means includes a computer processor in said system computer.

12. The mobile data system of claim 1, wherein said shutdown command creating means includes a computer processor in said system computer and an automated shutdown control program running on said computer processor.

13. A mobile data system having automated shutdown, wherein said mobile data system is mounted in a motor vehicle having a vehicle motor and a vehicle electrical power source for providing variable voltage electrical power to said motor vehicle and said mobile data system, said mobile data system comprising:
  a system computer having means for informational data retrieval in response to user input queries and means for creating a system shutdown command in response to parameter comparison data;
  a system interface device electrically connected with said vehicle electrical power source to receive variable voltage electrical power directly from said vehicle electrical power source;
  a computer power supply positioned in series between said system computer and said system interface device and electrically connected with said system interface device and said system computer to receive said variable voltage electrical power directly from said system interface device, convert said variable voltage electrical power to voltage regulated electrical power directly, and transmit said voltage regulated electrical power to said system computer for informational data retrieval operation thereof; and
  means for creating said parameter comparison data and transmitting said parameter comparison data from said system interface device to said system computer, wherein said parameter comparison data is a comparison of actual parameter values of an established operating parameter with a threshold parameter value.

14. The mobile data system of claim 13, wherein said parameter comparison data creating means includes a microprocessor in said system interface device and a system interface operating program running on said microprocessor.

15. The mobile data system of claim 13, wherein said parameter comparison data creating means includes a computer processor in said system computer.

16. The mobile data system of claim 13, wherein said system shutdown command creating means includes a computer processor and an automated shutdown control program running on said computer processor.

17. A mobile data system having automated shutdown, wherein said mobile data system is mounted in a motor vehicle having a vehicle motor and a vehicle electrical power source for providing variable voltage electrical power to said motor vehicle and said mobile data system, said mobile data system comprising:
  a system computer having means for informational data retrieval in response to user input queries;
  a system interface device electrically connected with said vehicle electrical power source to receive variable voltage electrical power directly from said vehicle electrical power source;
  a computer power supply positioned in series between said system computer and said system interface device and electrically connected with said system interface device and said system computer to receive variable voltage electrical power directly from said system interface device, convert said variable voltage electrical power to voltage regulated electrical power directly, and transmit said voltage regulated electrical power to said system computer for informational data retrieval operation thereof;
  said system interface device further having a microprocessor and a system interface operating program running on said microprocessor for creating parameter comparison data, wherein said parameter comparison data is a comparison of actual parameter values of an established operating parameter with a threshold parameter value;
  said system computer further having a computer processor and an automated shutdown control program running on said computer processor for reading said parameter comparison data and creating a system shutdown command in response to said parameter comparison data.

18. A method for automated shutdown of a mobile data system comprising:
  mounting a mobile data system in a motor vehicle, wherein said mobile data system has a computer power supply and a system computer capable of retrieving informational data in response to user input queries, and further wherein said motor vehicle has a vehicle motor and a vehicle electrical power source;
  transmitting variable voltage electrical power from said vehicle electrical power source to said computer power supply;
  converting said variable voltage electrical power to voltage regulated electrical power in said computer power supply;
  transmitting said voltage regulated electrical power directly from said computer power supply to said system computer for informational data retrieval operation thereof;
  establishing an established operating parameter as a shutdown indicator for said mobile data system;
  assigning a threshold parameter value to said established operating parameter;
  monitoring operation of said mobile data system or said motor vehicle to determine actual parameter values of said established operating parameter;
  comparing said actual parameter values with said threshold parameter value to create parameter comparison data; and
  interrupting transmission of voltage regulated electrical power to said system computer in response to said parameter comparison data.

19. The method of claim 18, further comprising running at least one application program on said system computer.

20. The method of claim 19, further comprising closing said at least one application program running on said system computer in response to said parameter comparison data.

21. The method of claim 19, further comprising creating a system shutdown command using said system computer prior to closing said at least one application program, wherein said system shutdown command is created in response to said parameter comparison data.

22. The method of claim 21, further comprising creating an enabling switch control signal in response to said system shutdown command and communicating said enabling switch control signal to said computer power supply.

23. The method of claim 22, further comprising terminating transmission of said voltage regulated electrical power from said computer power supply to said system computer in response to said enabling switch control signal.

24. The method of claim 18, wherein said established operating parameter is a time duration said vehicle motor is off or a charge level on said vehicle electrical power source.

25. The method of claim 18, wherein transmission of voltage regulated electrical power to said system computer is interrupted when said actual parameter value is equal to or falls below said threshold parameter value.

26. A method for automated shutdown of a mobile data system comprising:
mounting a mobile data system in a motor vehicle having a vehicle motor and a vehicle electrical power source;
transmitting variable voltage electrical power directly to said mobile data system from said vehicle electrical power source;
converting said variable voltage electrical power to voltage regulated electrical power for operation of said mobile data system;
running an application program in said mobile data system;
establishing an established operating parameter as a shutdown indicator for said mobile data system;
assigning a threshold parameter value to said established operating parameter;
monitoring operation of said mobile data system or said motor vehicle to determine actual parameter values of said established operating parameter;
comparing said actual parameter values with said threshold parameter value to create parameter comparison data; and
closing said application program in response to said parameter comparison data.

27. The method of claim 26, further comprising creating a system shutdown command prior to closing said application program, wherein said system shutdown command is created in response to said parameter comparison data.

28. The method of claim 26, further comprising terminating conversion of said variable voltage electrical power to said voltage regulated electrical power in response to said system shutdown command.

29. The method of claim 26, wherein said established operating parameter is a time duration said vehicle motor is off or a charge level on said vehicle electrical power source.

30. The method of claim 26, wherein said at least one application program running in said mobile data system is closed when said actual parameter value is equal to or falls below said threshold parameter value.

31. A mobile data system having automated shutdown, wherein said mobile data system is mounted in a motor vehicle having a vehicle motor and a vehicle electrical power source for providing variable voltage electrical power to said motor vehicle and said mobile data system, said mobile data system comprising:
a system computer having means for informational data retrieval in response to user input queries and means for creating a system shutdown command in response to charge level comparison data on said vehicle electrical power source;
a system interface device electrically connected with said vehicle electrical power source to receive variable voltage electrical power directly from said vehicle electrical power source;
a computer power supply positioned in series between said system computer and said system interface device and electrically connected with said system interface device and said system computer to receive said variable voltage electrical power directly from said system interface device, convert said variable voltage electrical power to voltage regulated electrical power directly, and transmit said voltage regulated electrical power to said system computer for informational data retrieval operation thereof;
means for creating said charge level comparison data, wherein said charge level comparison data is a comparison of actual charge level values with a threshold charge level value on said vehicle electrical power source; and
means for interrupting transmission of said voltage regulated electrical power from said computer power supply to said system computer in response to said system shutdown command.

32. A mobile data system having automated shutdown, wherein said mobile data system is mounted in a motor vehicle having a vehicle motor and a vehicle electrical power source for providing variable voltage electrical power to said motor vehicle and said mobile data system, said mobile data system comprising:
a system computer having means for informational data retrieval in response to user input queries;
a system interface device electrically connected with said vehicle electrical power source to receive variable voltage electrical power directly from said vehicle electrical power source;
a computer power supply positioned in series between said system computer and said system interface device and electrically connected with said system interface device and
said system computer to receive variable voltage electrical power directly from said system interface device, convert said variable voltage electrical power to voltage regulated electrical power, and transmit said voltage regulated electrical power to said system computer for informational data retrieval operation thereof;
said system interface device further having a microprocessor and a system interface operating program running on said microprocessor for creating charge level comparison data on said vehicle electrical power source, wherein said charge level comparison data is a comparison of actual charge level values with a threshold charge level value on said vehicle electrical power source;
said system computer further having a computer processor and an automated shutdown control program running on said computer processor for reading said charge level comparison data and creating a system shutdown command in response to said charge level comparison data.

33. A method for automated shutdown of a mobile data system comprising:
mounting a mobile data system in a motor vehicle, wherein said mobile data system has a computer power supply and a system computer capable of retrieving informational data in response to user input queries, and further wherein said motor vehicle has a vehicle motor and a vehicle electrical power source;

transmitting variable voltage electrical power from said vehicle electrical power source to said computer power supply;

converting said variable voltage electrical power to voltage regulated electrical power in said computer power supply;

transmitting said voltage regulated electrical power directly from said computer power supply to said system computer for informational data retrieval operation thereof; establishing charge level on said vehicle electrical power supply as a shutdown indicator for said mobile data system;

designating a threshold charge level value on said vehicle electrical power supply;

monitoring operation of said motor vehicle to determine actual charge level values on said vehicle electrical power supply;

comparing said actual charge level values with said threshold charge level value to create charge level comparison data; and interrupting transmission of voltage regulated electrical power to said system computer in response to said charge level comparison data.

* * * * *